Oct. 25, 1927.  
W. MAUSS  
1,646,653  
CAKE WASHING MEANS FOR ROTARY VACUUM FILTERS  
Filed Jan. 14, 1927
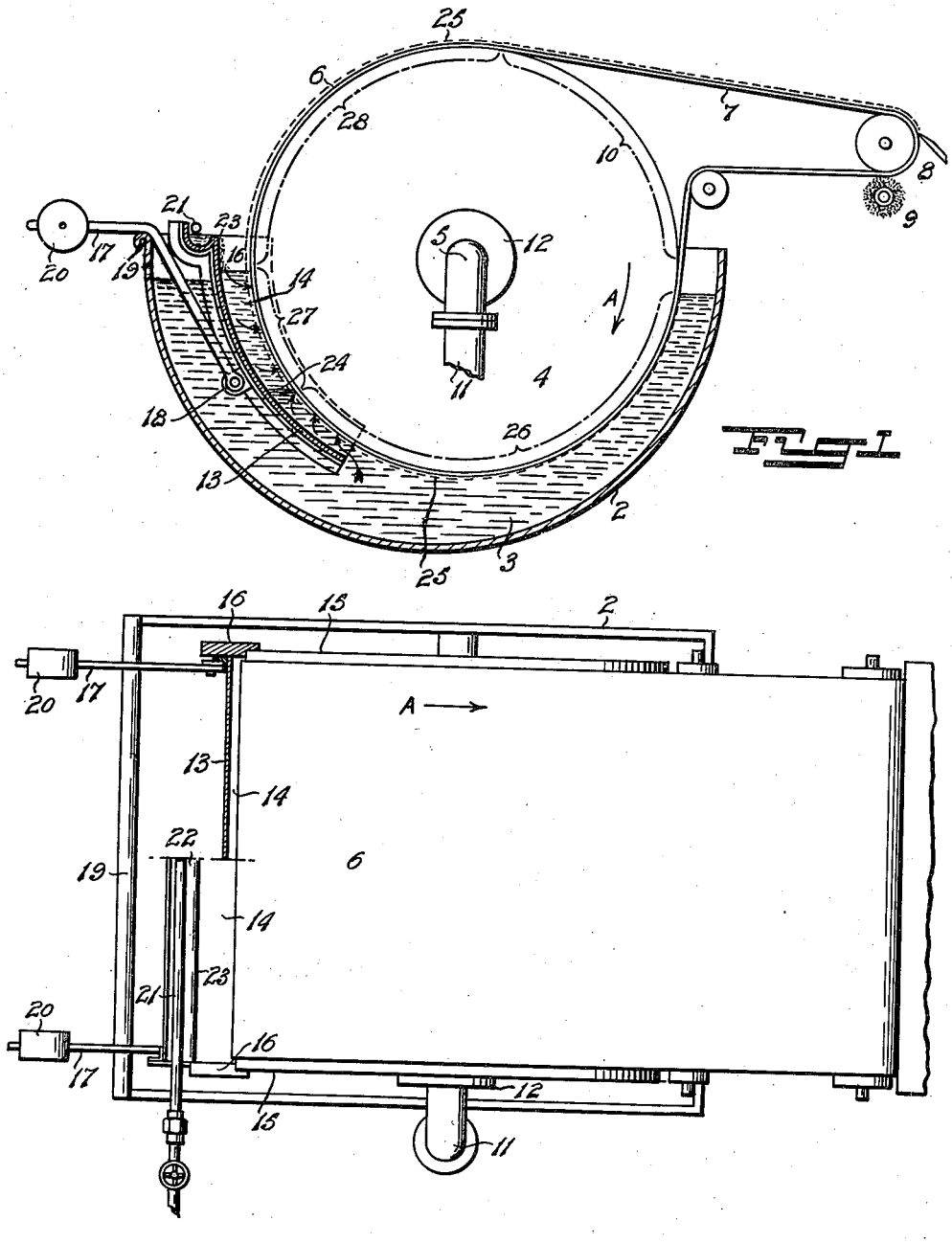
W. Mauss  
INVENTOR
By: Marks & Clerk  
Attys.

Patented Oct. 25, 1927.

1,646,653

UNITED STATES PATENT OFFICE.

WILHELM MAUSS, OF DURBAN, NATAL, SOUTH AFRICA.

CAKE-WASHING MEANS FOR ROTARY VACUUM FILTERS.

Application filed January 14, 1927. Serial No. 161,197.

The present invention refers to rotary drum filters, the object being to enable the cake to be effectively washed; that is, to permit the residual filtrate to be adequately displaced from the cake by the minimum quantity of wash liquid.

Hitherto it has been usual to wash the cake by spraying the wash liquid onto a segment of the cake which has emerged from the filtrant. This method has the disadvantage that a spray does not uniformly cover the whole cake surface under treatment, individual small areas directly in the lines of the jets receiving an undue share of the wash liquid and intervening areas receiving less than their proper share. As also the jets have to be fine in order to distribute the liquid as widely as possible whilst limiting its quantity, the jet nozzles or apertures have to be very small and for that reason are liable to stoppage. Some filter cakes, such as the albuminous cakes derived from sugar juice, are so delicate that spraying is liable to destroy and detach them.

The present invention enables the cake on a rotary drum filter to be washed with a solid body of water, as in the fixed leaf type of vacuum filter or a filter press, with however the advantage over said types that by reason of the rotation of the filter surface through the washing zone, the washing is uniform all over the cake area; whereas in the fixed leaf or press filter the lower end of the leaf takes up the greatest proportion of the wash due to its being the first to be covered and the last to be uncovered by the wash liquid as the latter is being applied and withdrawn, and to its being under a greater head of wash liquid than the upper part of the leaf while washing is in progress.

The invention is illustrated in the accompanying drawing in which

Fig. I shows a partly sectioned elevation of a vacuum drum filter.

Fig. II is a plan with parts broken away.

2 indicates the tank containing the material 3 which is to be filtered. The filter drum 4 is partly submerged in said liquid and is rotatable about its axis 5. 6 is the filter cloth; which in the example shown is lapped about only a portion of the drum periphery, being looped away therefrom at 7 for removal of the cake and cleaning by means of appliances indicated by 8, 9. The cloth may however, in the well known manner, be fixed to the drum and cleaned while in position within the segment 10 of the drum. 11 is the outlet pipe for filtrate, connected to suitable suction apparatus. 12 is the usual rotary valve by which the suction is restricted to the desired segments of the drum periphery.

13 indicates a shield which fits around the drum on the outgoing side and is separated from the drum surface to leave a narrow chamber 14. The drum edges 15 are machined to true cylindrical form and the shield is provided with side members 16 shaped to fit the drum edges and so make a reasonably water tight joint with them.

The shield 13 is supported by levers 17 hinged to it at 18. The levers are bent and rest loosely on the edge 19 of the tank. Their outer ends carry counterweights 20 which hold the side members 16 against the drum edges 15 with steady yielding pressure. When the filter cloth 6 is to be changed the shield with its supporting levers is simply lifted out of place.

The chamber 14 is open at the top and bottom. Water or other wash liquid is fed to the top of the chamber by a perforated pipe 21; the upper end of the shield being appropriately formed to distribute the water evenly and without force into the chamber 14. For this purpose it may be formed as a trough 22 into which the water is delivered, and having a lip 23 over which the water flows to the chamber 14.

Water fed to the chamber 14 displaces filtrant which would otherwise occupy the space of the upper part of said chamber. The water and filtrant being in direct contact at a common surface such as 24 which is above the lower end of the chamber 14, and the filtrant hydrostatically supporting the water, upon the drum being slowly revolved in the direction indicated by the arrow A and the vacuum being applied, the filter cake 25 forms on the filter cloth in the drum segment 26 and is washed in the segment 27 within the chamber 14, by wash water drawn through the formed cake from the body of water contained in said chamber.

Although the wash water and filtrant are in direct contact with one another, any appreciable mixing of them is avoided. This is partly due to the wash water being usually somewhat lighter than the filtrant and therefore tending to remain above the same at their point of contact. It is further due to proper regulation of the rate of supply of wash water, this being so adjusted that the down-flowing stream of wash water is completely absorbed by the filter within the space of the segment 17.

As it is usual for the drum to rotate slowly enough to avoid agitation of the liquid in contact with it there is no appreciable tendency of the wash and filtrant to become mixed from this cause.

Mixing is also avoided by making the chamber 14 narrow, so as to minimize the area of contact between the wash and the filtrant. At the same time the chamber area should be sufficient to permit the necessary volume of wash to flow through it tranquilly, and with this object the chamber may be comparatively wide at the top and narrow gradually downwards to correspond roughly with the progressive diminution of flow through it due to wash passing into the drum.

The circumferential extent of the washing zone 27 is adjusted as required by varying the rate of supply of the wash liquid. With constant rotation of the drum and constant vacuum, increase of the rate of supply will lower the contact surface 24 and so extend the washing zone; whilst diminution of the rate of supply will correspondingly restrict the washing zone 27 and prolong the filtering zone 26. This regulation is made as is found necessary according to the amount of valuable residue left in the discarded cake. When the wash liquid is lighter than the filtrant the circumferential extent of the washing zone is indicated by the height at which the surface of the wash in the chamber 14 stands above the level of the filtrant in the tank 2.

The level of the filtrant in the tank 2 may vary from time to time owing to changing rates of filtering and of supply of filtrant. When this occurs the hydrostatic balance between the filtrant and the wash liquid causes the contact surface 24 to move up or down correspondingly with the level of the filtrant. The extent of the washing zone 27 thus remains approximately constant notwithstanding variation of the filtrant level; the normal distance between the surface 24 and the open bottom of the chamber 14 being so adjusted that, with reasonable variations of filtrant level, the surface 24 is always well above the bottom of the chamber.

The drawing shows a single suction outlet 11 from which both filtrate and wash liquid are withdrawn, so that the wash mingles with the filtrate. This arrangement is generally practicable because the use of the invention is found to limit the amount of wash to little more than that required to displace the original liquid in the cake. It will be evident however that a separate suction outlet for wash may be provided if desired.

When the cake is to be dried, the suction is continued beyond the washing segment 27 into the segment 28 between the washing segment and the point where the cloth is looped off or otherwise treated for the removal of the precipitate.

I claim:

1. The method of washing a filter cake in a rotary drum filter, which consists in maintaining, at the outgoing segment of the drum, a body of wash liquid hydrostatically supported by the filtrant, continuously passing liquid from said body through the filter and continuously replenishing the body to maintain the desired circumferential extent of the wash liquid body in hydrostatic balance with the filtrant.

2. The method of washing a filter cake in a rotary drum filter which consists in maintaining around the drum filter surface a body of filtrant and a body of wash liquid in contact with each other without substantial intermingling, and rotating the drum first past the filtrant and then past the wash liquid.

3. In a rotary drum filter, the combination of a filtrant tank, a rotary drum positioned to be partially immersed in liquid in the tank, a shield around the outgoing segment of the drum and providing between itself and the drum a washing chamber open below and closed at the sides, and means to supply wash liquid to said chamber.

4. In a rotary drum filter, the combination of a filtrant tank, a rotary drum positioned to be partially immersed in liquid in said tank and having machined edges, a shield around and spaced from the outgoing segment of the drum and comprising sides fitting the machined edges of the drum, and means to suply wash liquid to the chamber between the shield and the drum.

5. In a rotary drum filter, the combination of a filtrant tank, a rotary drum positioned to be partially immersed in liquid in said tank, a shield around the outgoing segment forming with the drum a radially narrow and downwardly tapering washing chamber open below and closed at the sides, and means to supply wash liquid to said chamber.

6. In a rotary drum filter, the combination of a filtrant tank, a rotary drum positioned to be partially immersed in liquid in said tank, a shield around and spaced from the filtering surface of the drum, and means for holding the shield in yielding contact with the drum.

7. In a rotary drum filter, the combination of a filtrant tank, a rotary drum positioned to be partially immersed in liquid in said tank, a shield around and spaced from the filtering surface of the drum, and a counter-weighted lever support holding the shield in contact with the drum and itself loosely mounted on the tank.

In testimony whereof I affix my signature.

WILHELM MAUSS.